July 29, 1941.  F. H. KOEHLER  2,251,139

NASAL FILTER

Filed Nov. 9, 1938

INVENTOR
FRED H. KOEHLER
BY Richard Van Buren
HIS ATTORNEY

Patented July 29, 1941

2,251,139

UNITED STATES PATENT OFFICE 2,251,139

NASAL FILTER

Fred Hurman Koehler, Fort Thomas, Ky.

Application November 9, 1938, Serial No. 239,636

3 Claims. (Cl. 128—148)

This invention relates to a filtering device to be worn in the nostrils for the purpose of filtering foreign substances out of the air breathed by the wearer.

Nasal filters, for use by those subject to hay fever and other diseases of the air passages, have created considerable interest due to their efficacy in the treatment of such diseases.

However, heretofore filters for this purpose have been commercially unsuccessful because they were cumbersome and uncomfortable to the wearer, or because they were so conspicuous that they attracted quite a bit of unwelcome attention to the sometimes quite sensitive wearer. Likewise certain of the former nasal filters were unsuccessful because they required the use of a special filtering element obtainable only from certain sources of supply and usually at a comparatively high price.

An object of this invention is the provision of a light, comfortable and efficient filtering device to be worn in the nostrils for the purpose of filtering dust, lint, pollen and other impurities out of the air breathed by the wearer.

Another object is to provide a nasal filter that conforms to the shape of the nostril, one that is practically unnoticeable, yet fits firmly in place and is easily inserted or removed.

Still another object is to provide a nasal filter in which the filtering element may be quickly, easily and economically changed.

A further object is the provision of a nasal filter having means for retaining it in proper position in the nostrils of the wearer and having means to facilitate easy insertion and removal thereof.

With these and incidental objects in view, the invention includes certain novel features of construction and combinations of parts, the essential elements of which are set forth in appended claims and a preferred form or embodiment of which is hereinafter described with reference to the drawing which accompanies and forms a part of this specification.

Description

Figure 1:
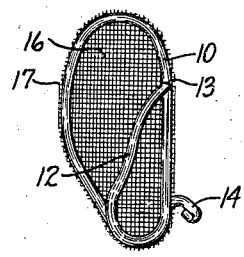
Fig. 1 is a plan view of the right-hand nasal filter of this invention.

The subject of this invention is a light, compact, efficient and inexpensive nasal filter to be worn in the nostrils of persons suffering from hay fever, asthma and other respiratory diseases, and also may be worn by persons who find it necessary to breathe air containing an unusual amount of undesirable foreign substances, such as dust, lint, etc.

The four figures of the drawing illustrate a nasal filter formed of coiled wire of the proper size and weight and preferably made of some non-corrodible material such as stainless steel, silver or any other suitable substance. The wire is coiled so as to fit snugly the contour of the nostrils without being uncomfortable to the wearer, and is so designed as to be easily inserted and removed and to remain firmly in place, irrespective of minor accidents such as bumping the nose, sneezing and the like.

The body portion of the filter comprises two full coils of wire 10 and 11, substantially oval in shape, to fit the contour of the nostril. The upper coil 10 of wire is extended upwardly from the front and inside portion of the filter body in an irregular curve 12, substantially at right angles to the body of the filter and is adapted to rest lightly against the septum of the nose to support and hold the body portion in proper position in relation to the nostril, and to prevent accidental displacement of the filter.

The curved support 12 finally joins the upper coil 10 near the rear of the filter at 13 and, if desired, may be secured to said coil by soldering, welding or in some other suitable manner.

A continuation of the lower coil 11 of the body portion is curved downwardly from the front and inside portion of the filter body and forms a hook 14 which rests against the septum of the nostril and opens outwardly therefrom, said hook being so shaped as to be hidden from view when the filter is properly inserted in the nostril.

The hook 14 in addition to assisting the upper support 12 in retaining the filter in place, also provides a convenient means for inserting and removing the filter.

To insert the filter, the hook 14 is grasped between the thumb and forefinger, after which said filter may be easily placed in proper position in the nostril.

To remove the filter, the hook 14 is caught by the nail of the forefinger and said filter may then be easily worked downwardly out of the nostril of the wearer.

Figure 4:
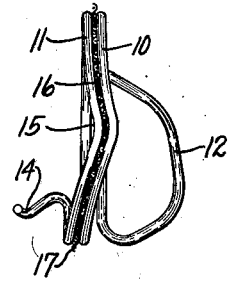
Fig. 4 is a right elevation of the right-hand filter.

The coils 10 and 11 (Fig. 4) of the body portion, are curved upwardly on the outside at 15 to fit the contour of the nostril and to further render the filter inconspicuous.

The body coils 10 and 11 are here shown slightly separated, however, this is an exaggeration to better show how the filtering element 16 fits therebetween. Actually the coils 10 and 11 fit snugly but yieldingly together, so as to firmly clamp the filtering element in place. The filtering element 16 may be of any suitable material, ordinary gauze bandage, procurable most anywhere, being highly satisfactory as a filtering medium.

It is a simple matter indeed to change filtering elements in the filter of this invention, as all that is required is to slip one or more thicknesses of gauze between the coils 10 and 11 and trim off the surplus by following the outline of said coils with a pair of scissors.

Figure 2:
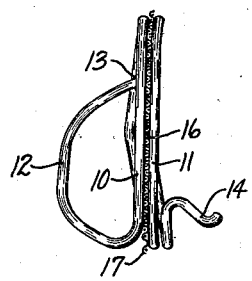
Fig. 2 is a left elevation of the right-hand nasal filter.
Figure 3:
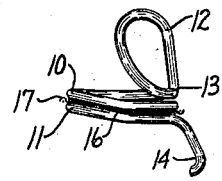
Fig. 3 is a front view of the right-hand filter.

The protruding edge left on the filtering element, after trimming, as at 17 (Figs. 1 and 2), increases the efficiency of the filter by forming a seal between the body portion of said filter and the wall of the nostril, thereby insuring that all air breathed by the wearer passes through the filter.

The efficiency of the filter may be further increased by the addition of a drop or so of any suitable nasal oil to the filtering element 16.

Figure 5:
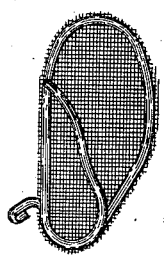
Fig. 5 is a plan view of the left-hand mate to the right-hand nasal filter shown in Figs. 1 to 4.

The nasal filter here shown and described is for use in the right nostril and has a left-hand mate, illustrated in Fig. 5, identical in every respect thereto, except the contours thereof are reversed to fit the left nostril.

It is a known fact that the nostrils of individuals vary considerably in size, and it is the intention to supply the filter of this invention in a sufficient number of sizes to take care of all needs in this respect.

Summarizing briefly, the above specification discloses a practical and efficient nasal filter of novel construction that is comfortable to the wearer and inconspicuous to others, and is of decided value to those subject to hay fever and other diseases of the air passages and to those who find it necessary to breathe air containing various undesirable foreign substances.

While the form of mechanism herein shown and described is admirably adapted to fulfill the objects primarily stated, it is to be understood that it is not intended to confine the invention to the one form or embodiment herein disclosed, for it is susceptible of embodiment in various forms, all coming within the scope of the claims which follow.

What is claimed is:

1. In a concealed type of nasal filter comprising right-hand and left-hand elements for insertion within each of the nostrils, the combination of upper and lower coils formed of one continuous piece of non-corrodible wire, said coils shaped to fit the contour of the nostril and arranged to yieldingly engage each other; filtering material for insertion between the adjacent surfaces of the upper and lower coils where it is firmly held against displacement by the resilient action of the coils, said material adapted to be trimmed to the outline of the coils, after insertion therebetween, to form an irritation-preventing cushion and an air-seal between the coils and the wall of the nostril; a septum engaging portion formed from a continuation of the upper coil and adapted to hold the coils and the filtering material in proper relationship to the nostril; and a hook-shaped portion formed from a continuation of the lower coil for use in inserting and removing the filter, said hook-shaped portion adapted to be concealed within the nostril.

2. A nasal filter of the invisible type including right-hand and left-hand elements adapted to be inserted in the right-hand and left-hand nostrils, said elements each comprising, in combination, a body portion formed of upper and lower continuous coils of wire so shaped as to snugly fit the contour of the nostril, said coils yieldingly contacting each other so as to securely clamp filtering material, such as gauze, therebetween; a support member being a continuation of the upper coil and adapted to extend upwardly and rearwardly in an irregular curve from the front and inside of said upper coil and substantially at right angles thereto, and to then curve downwardly into engagement with said upper coil, said support arranged to engage the septum of the nose to retain the body portion in proper relation to the nostril; and a finger piece being a continuation of the lower coil of the body portion and arranged to extend downwardly from the front and inside of said lower coil in an irregular curve which terminates in a hook, concealed within the nostril, for use in inserting and removing the filter.

3. In an invisible type of nasal filter comprising separate and disconnected elements for insertion in each nostril, each element being constructed of one piece of non-corrodible wire formed into upper and lower coils which conform to the shape of the nostril, said coils arranged to yieldingly engage each other to form a clamping means for filtering material inserted therebetween, said filtering material adapted to be trimmed to the outline of the coils, after being inserted therebetween, to form a cushion and an air-seal between the coils and the wall of the nostril, the upper coil of said element terminating in a septum engaging portion to hold the element in proper relationship to the nostril and the lower coil of said element terminating in a hook-shaped extension adapted to be concealed within the nostril and for use in inserting and removing the element.

FRED HURMAN KOEHLER.